(12) United States Patent
Dietel et al.

(10) Patent No.: US 12,397,948 B2
(45) Date of Patent: Aug. 26, 2025

(54) DEVICE FOR FILLING A NON-VACUUM-RESISTANT SYSTEM BY MEANS OF VACUUM PRESSURE FILLING

(71) Applicant: Dürr Somac GmbH, Stollberg (DE)

(72) Inventors: Dany Dietel, Oederan (DE); Uwe Staffa, St. Egidien (DE); Stefan Rumbke, Chemnitz (DE); Michael Rathe, Beierfeld (DE)

(73) Assignee: Dürr Somac GmbH, Stollberg (DE)

( * ) Notice: Subject to any disclaimer, the term of this patent is extended or adjusted under 35 U.S.C. 154(b) by 0 days.

(21) Appl. No.: 18/566,525

(22) PCT Filed: May 19, 2022

(86) PCT No.: PCT/DE2022/000053
§ 371 (c)(1),
(2) Date: Dec. 1, 2023

(87) PCT Pub. No.: WO2022/253377
PCT Pub. Date: Dec. 8, 2022

(65) Prior Publication Data
US 2024/0278949 A1    Aug. 22, 2024

(30) Foreign Application Priority Data
Jun. 2, 2021 (DE) ...................... 10 2021 003 048.6

(51) Int. Cl.
*B65B 31/02* (2006.01)
(52) U.S. Cl.
CPC ................... *B65B 31/02* (2013.01)
(58) Field of Classification Search
CPC ... B65B 31/02; B65B 31/022; B65B 2210/06; B65B 3/16; B65B 31/025; B65B 55/10;
(Continued)

(56) References Cited

U.S. PATENT DOCUMENTS 4,658,566 A * 4/1987 Sanfilippo ............ B65B 31/022
53/510
4,905,454 A 3/1990 Sanfilippo et al.
(Continued)

FOREIGN PATENT DOCUMENTS

AT      230289 B    11/1963
DE      1257661 B   12/1967
(Continued)

OTHER PUBLICATIONS

German Patent and Trademark Office, "Research Report," issued in connection with German Patent Application No. 102021003048.6, dated Feb. 6, 2021, 10 pages. (Machine Translation Included).
(Continued)

*Primary Examiner* — Veronica Martin
(74) *Attorney, Agent, or Firm* — Hanley, Flight & Zimmerman, LLC

(57) ABSTRACT

The invention relates to a device for filling an assembly of a non-vacuum-resistant system with a service fluid. The problem addressed by the invention is that of providing a device by means of which such non-vacuum-resistant systems can be filled air-free by means of vacuum pressure filling and can be closed. Said problem is solved in that the device has a vacuum chamber (1) for holding at least one assembly (3) to be filled, wherein: in the interior of the vacuum chamber (1), a rotary device (4) for supporting and moving at least one holding unit (5) for an assembly (3) to be filled is disposed in the lower region; the at least one holding unit (5) is assembled from at least two separate segments (51; 52), which, in the assembled position, form a common free available space (53) in their interior, the inner contour of said available space being congruent to the outer contour of the assembly (3) to be filled; in one segment (52) of the holding unit (5), an additional free available space (54) is formed above the outer contour of the assembly (3)

(Continued)

to be filled; in the interior of the vacuum chamber (1), a screwing tool (7) for a closure element (8) of the assembly (3) to be filled and a filling unit (6) are disposed above the holding unit (5); the portions of the screwing tool (7) and of the filling unit (6) which are to be operatively connected to the assembly (3) to be filled can each be moved into the additional free available space (54) of the holding unit (5) above the outer contour of the assembly (3) to be filled.

8 Claims, 7 Drawing Sheets

(58) Field of Classification Search
    CPC ............... B65B 47/10; B67C 7/0073; B67C 2003/2691; B67C 2003/228; B67C 2003/2694; B67C 3/24; B67C 7/0086; B67C 3/2634; B29C 2049/4664; B29C 2049/627; B29C 2049/7831; B29C 2791/006
    See application file for complete search history.

(56) References Cited

U.S. PATENT DOCUMENTS

| | | | |
|---|---|---|---|
| 6,199,350 B1 | 3/2001 | Brechel | |
| 6,230,472 B1 * | 5/2001 | Stahlecker | ............... A61L 2/14 53/89 |
| 2020/0290857 A1 | 9/2020 | Stubbings | |
| 2022/0119136 A1 | 4/2022 | Siewecke | |

FOREIGN PATENT DOCUMENTS

| | | |
|---|---|---|
| DE | 29619396 U1 | 3/1998 |
| DE | 19716846 C1 | 11/1998 |
| DE | 19806520 A1 | 8/1999 |
| DE | 19817735 C1 | 11/1999 |
| DE | 19700436 C2 | 5/2001 |
| DE | 102007029020 A1 | 12/2008 |
| DE | 102014216562 A1 | 2/2016 |
| DE | 102014011611 B4 | 12/2018 |
| DE | 102017114392 A1 | 1/2019 |
| DE | 102018000958 A1 | 9/2019 |
| DE | 102018124348 A1 | 4/2020 |
| EP | 0965524 A1 | 12/1999 |
| JP | 2020179873 A | 11/2020 |
| WO | 9821099 A1 | 5/1998 |

OTHER PUBLICATIONS

International Searching Authority, "International Preliminary Report on Patentability," issued in connection with International Patent Application No. PCT/DE2022/000053, mailed on Dec. 14, 2023, 16 pages. [English translation included].

International Searching Authority, "International Search Report and Written Opinion," issued in connection with International Application No. PCT/DE2022/000053, Dec. 6, 2022, 13 pages, with English translation of the International Search Report.

\* cited by examiner

DEVICE FOR FILLING A NON-VACUUM-RESISTANT SYSTEM BY MEANS OF VACUUM PRESSURE FILLING

RELATED APPLICATION

This application is a national phase of international application No. PCT/DE2022/000053, filed on May 19, 2022, and claiming the benefit of German application No. 10 2021 003 048.6, filed on Jun. 2, 2021, both of which are incorporated herein by reference in their entirety and for all purposes.

FIELD OF THE DISCLOSURE

Examples disclosed herein relate to a device for filling an assembly of a non-vacuum-resistant system with a service fluid by means of vacuum pressure filling and its subsequent closure.

BACKGROUND

For numerous technical applications, liquids or gases must be supplied as service fluids to a technical hardware system. Vacuum-assisted pressure filling is increasingly being used to enable air-free filling of the respective system. The system to be filled is first evacuated by extracting the gases contained in this system using a vacuum pump. This ensures that the system is free of air before it is filled with the respective filling medium.

A typical area of application for vacuum pressure filling is the automotive industry. Vehicles are filled with the required service fluids at the manufacturers' assembly lines. These service fluids are fed from filling systems via connecting lines and filling adapters into the circuits and containers of the vehicles to be filled. Such applications are known, for example, from DE 197 00 436 C2, DE 10 2007 029 020 A1 and DE 10 2014 011 611 B4 and do not cause any problems due to the principle, because the circuits and containers of the vehicles to be filled are designed to be vacuum-resistant.

However, if vacuum pressure filling is to be used to fill a non-vacuum-resistant system, this system would collapse under vacuum. Ultrasonic probes for applications in medical technology are a typical example of this. These assemblies are mainly filled by means of flushing, but this does not result in air-free filling. To date, there are also no alternative processes available on the market for filling such assemblies air-free.

SUMMARY

The problem addressed by examples disclosed herein is that of creating a device with which non-vacuum-resistant systems can also be filled and sealed air-free by means of vacuum-pressure filling.

This problem is solved by the device having a vacuum chamber for holding at least one assembly to be filled. A rotary device for supporting and moving at least one holding unit for an assembly to be filled is disposed in the lower section of the interior of the vacuum chamber. The at least one holding unit is assembled from at least two separate segments which, in the assembled position, form a common free available space in their interior, the inner contour of said available space being congruent with the outer contour of the assembly to be filled. An additional free available space is formed in a segment of the holding unit above the outer contour of the assembly to be filled. A screwing tool for a closure element of the assembly to be filled and a filling unit are disposed in the interior of the vacuum chamber above the holding unit. The sections of the screwing tool and the filling unit to be brought into operative connection with the assembly to be filled can each be moved into the additional free available space of the holding unit above the outer contour of the assembly to be filled.

Further embodiments, the technical features of which will be explained in more detail based on an exemplary embodiment, are the subject matter of dependent claims.

The basic approach to a solution is therefore that a non-vacuum-resistant assembly or a complete non-vacuum-resistant system is disposed in a vacuum chamber with structurally integrated filling and closing equipment and moved into an optimum position for the respective process step using special handling equipment. The vacuum chamber only comprises a single opening, which makes a fundamentally different process sequence possible than with the usual filling of non-vacuum-resistant systems by means of flushing.

By using a vacuum chamber in which the assembly or system to be filled is located during evacuation and filling, it is also possible to evacuate components that are not vacuum-resistant. This is achieved by also evacuating the vacuum chamber during evacuation. This means that the pressure in the assembly or system to be filled remains the same as the pressure surrounding it. This prevents the assembly or system to be filled from collapsing and allows subsequent air-free filling with a service fluid.

When using the solution according to examples disclosed herein, no manual handling of an assembly to be filled or a system to be filled is required for adapting a filling tool. All the necessary translational and rotational feed movements can be implemented thanks to the assemblies being structurally integrated in the vacuum chamber. It is essential for the functionality that all seals between the drives disposed outside the vacuum chamber and the filling and handling equipment disposed inside the vacuum chamber are vacuum-resistant.

This creates a device with which systems that could not previously be filled air-free because they do not have the required vacuum resistance can be filled and closed air-free by using a vacuum-pressure method. As a result, this technical solution can be used in numerous applications.

An exemplary embodiment is explained below with reference to the drawing.

DETAILED DESCRIPTION OF THE DRAWINGS

Figure 1:
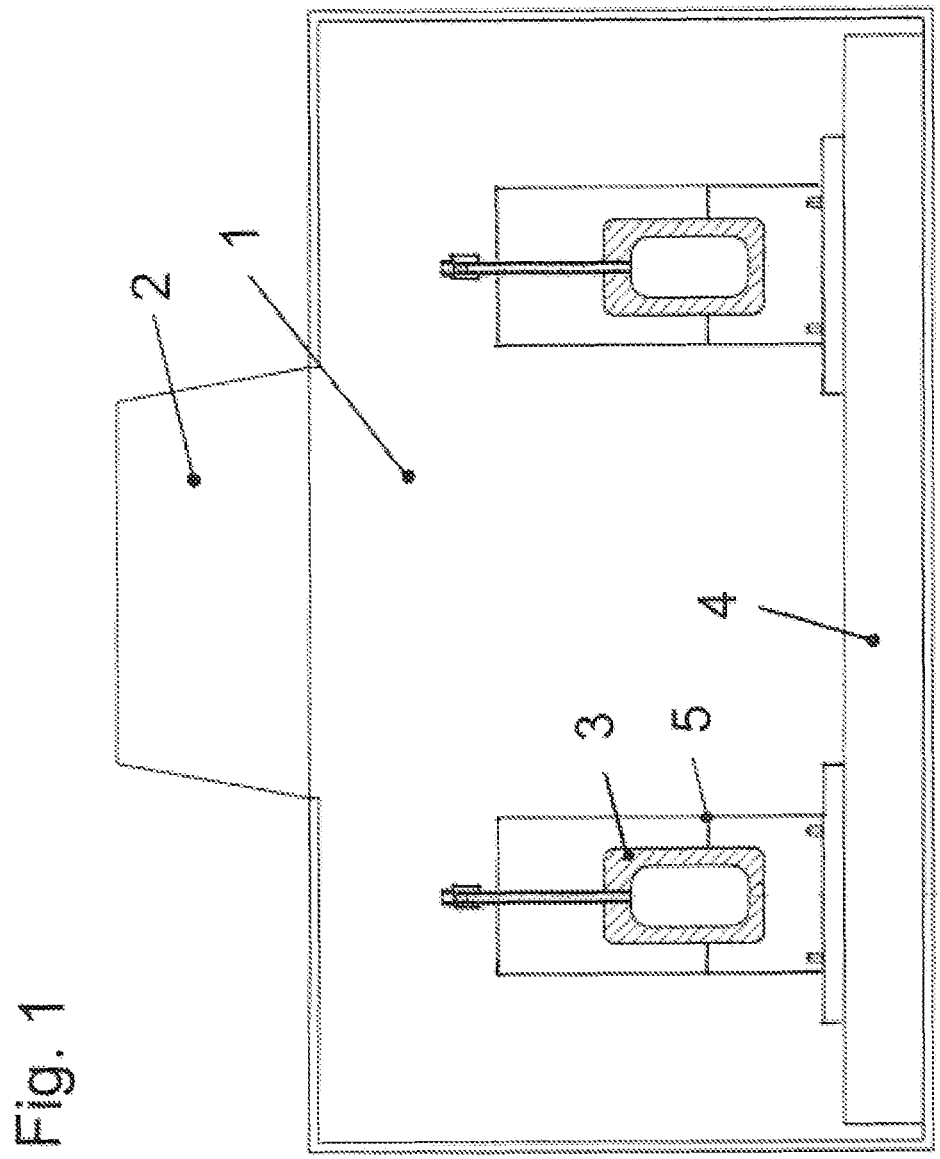
FIG. 1 shows a stylized representation of the structure of the device

According to FIG. 1, the device comprises a vacuum chamber 1, the interior of which is accessible via a closing device 2. At least one assembly to be filled is disposed in the interior, in the specific exemplary embodiment an ultrasonic probe 3, the basic structure of which is shown in FIG. 2.

Figure 3:
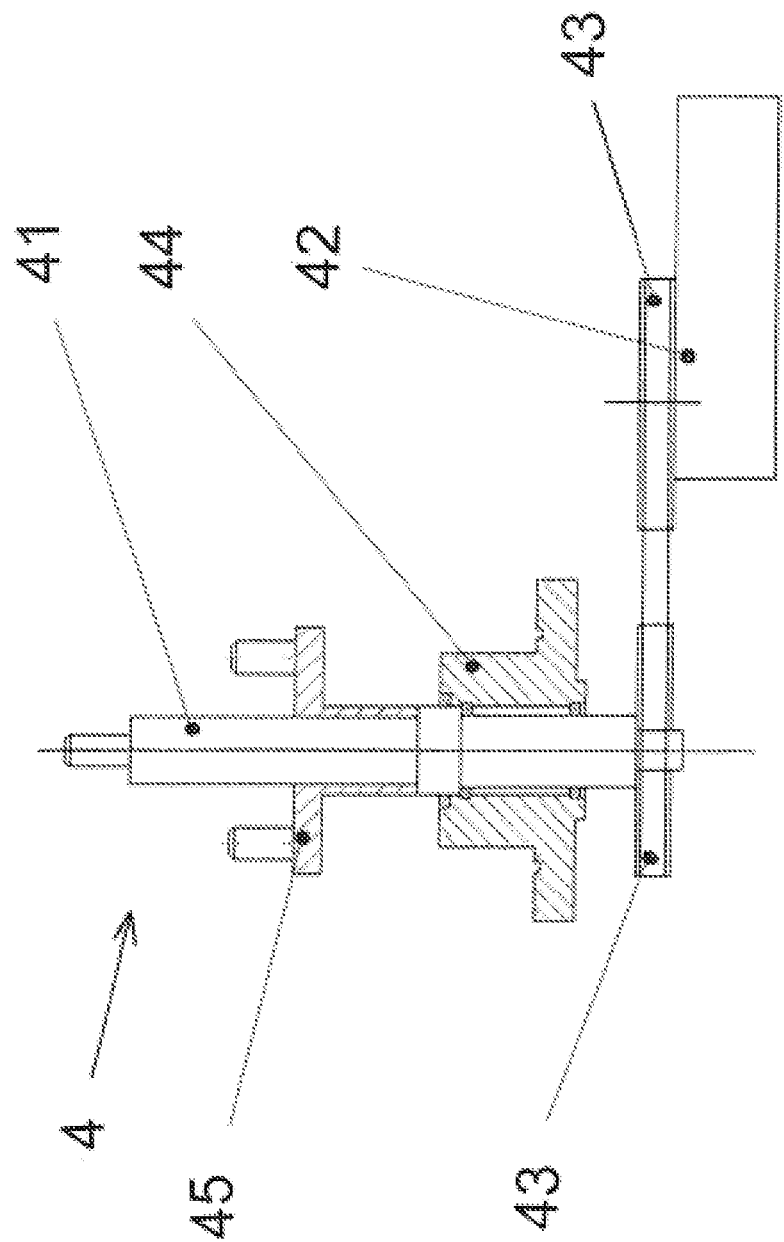
FIG. 3 shows a rotary device with drive

A rotary device 4 for supporting and moving at least one holding unit 5 for the ultrasonic probe 3 is disposed in the lower area of the interior of the vacuum chamber 1. The basic structure of said rotary device 4 is shown in FIG. 3. The rotary device 4 has a shaft 41 with centering pin and tensioner for the holding unit 5. The drive of the rotary device 4 is designed as a swivel drive 42 with toothed belt pulleys 43 and is disposed outside the vacuum chamber 1. Starting from its drive 42, the rotary device 4 is supported in the housing of the vacuum chamber 1 via a flange 44 with bearing and vacuum-resistant rotary feedthrough.

Figure 7:
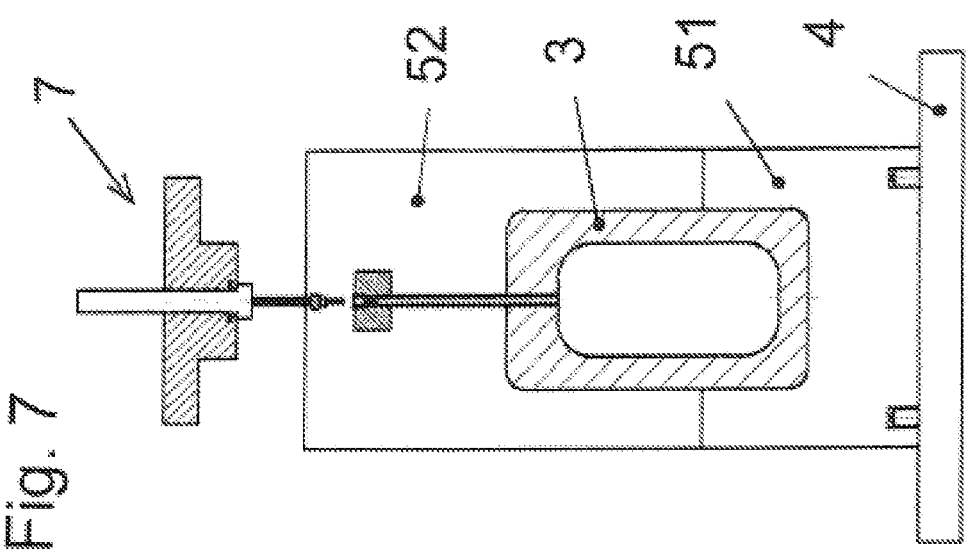
FIG. 7 shows the operative connection between the screwing tool and the holding unit

Congruent locking elements are provided on the top side of the rotary device 4 and on the bottom side of the segment 51 of the holding unit 5 resting on the rotary device 4 in the assembled position. These can, for example, be designed as two sword bolts 45 on the rotary device 4 as shown in FIG. 3 and as cylindrical recesses 55 on the segment 51 of the holding unit 5 as shown in FIG. 2. The operative connection of these locking elements can be seen, for example, in FIG. 5 and FIG. 7.

Figure 2:
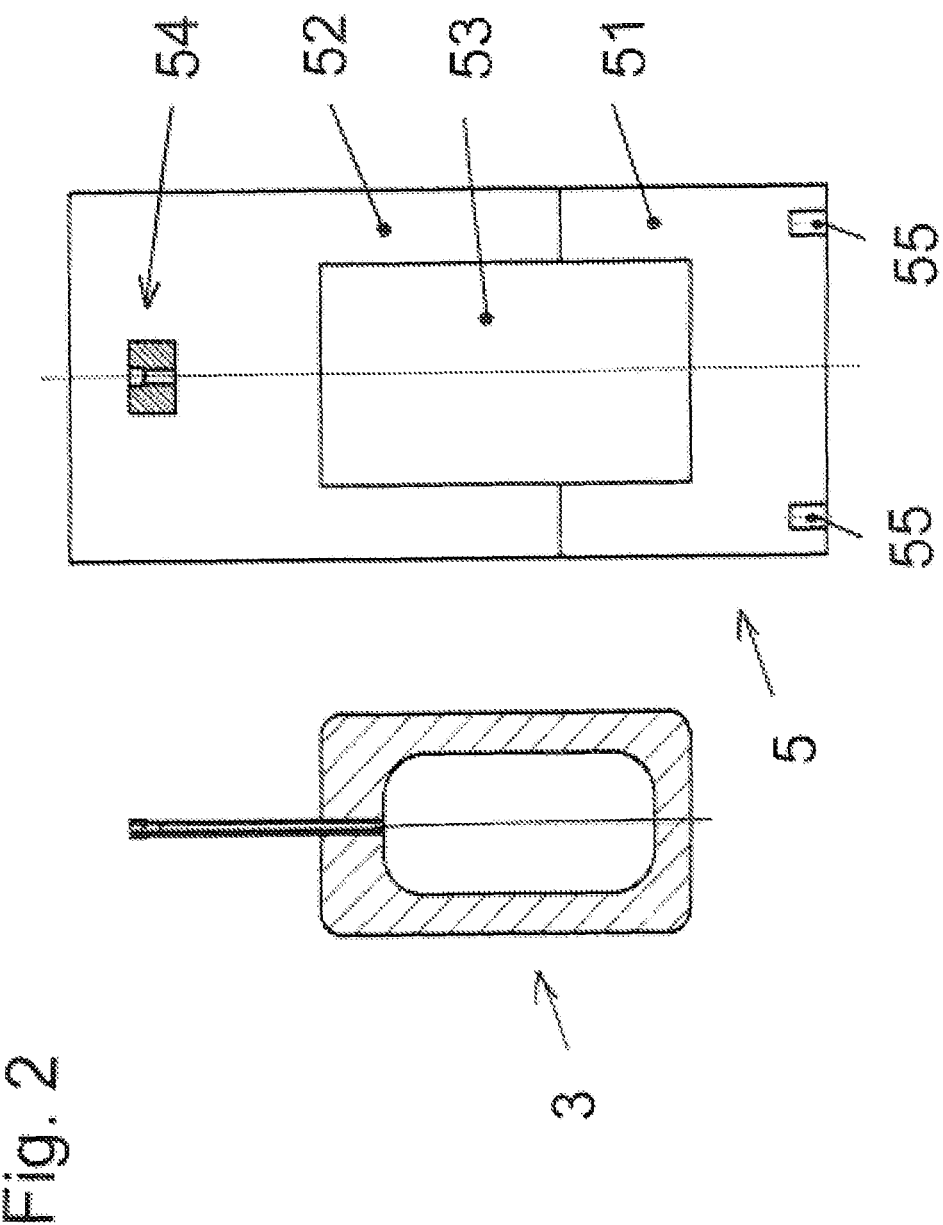
FIG. 2 shows an assembly to be filled and a holding unit

The basic structure of a holding unit 5 is shown in FIG. 2. Accordingly, a holding unit 5 is made up of at least two separate segments 51 and 52. In their assembled position in the interior, these segments 51 and 52 form a common free available space 53. The inner contour of said free available space 53 is congruent with the outer contour of the ultrasonic probe 3 to be filled. Furthermore, an additional free available space 54 is formed in a segment 52 of the holding unit 5 above the outer contour of the ultrasonic probe 3 to be filled.

A filling unit 6 and a screwing tool 7 for a closure element 8 of the ultrasonic probe 3 are disposed in the interior of the vacuum chamber 1 above the holding unit 5. The sections of the screwing tool 7 and the filling unit 6 to be brought into operative connection with the ultrasonic probe 3 can each be moved into the additional free available space 54 of the holding unit 5 above the outer contour of the ultrasonic probe 3 to be filled.

Figure 4:
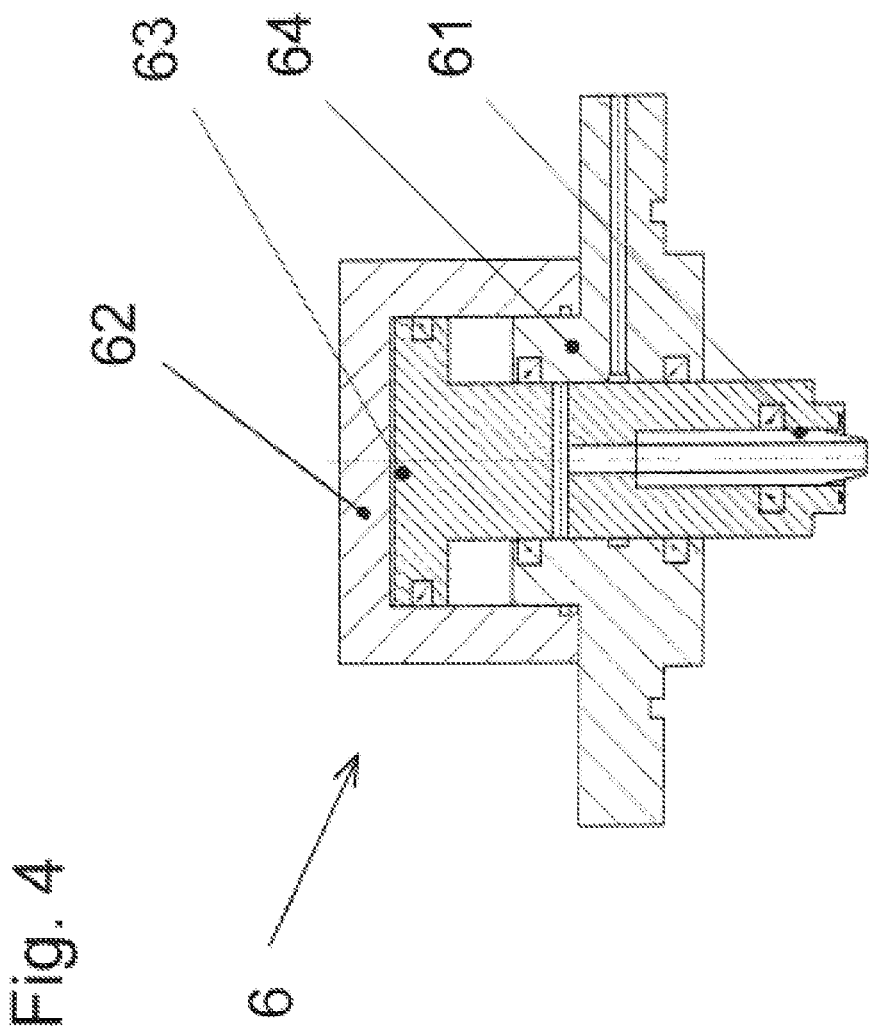
FIG. 4 shows a filling unit as a separate assembly
Figure 5:
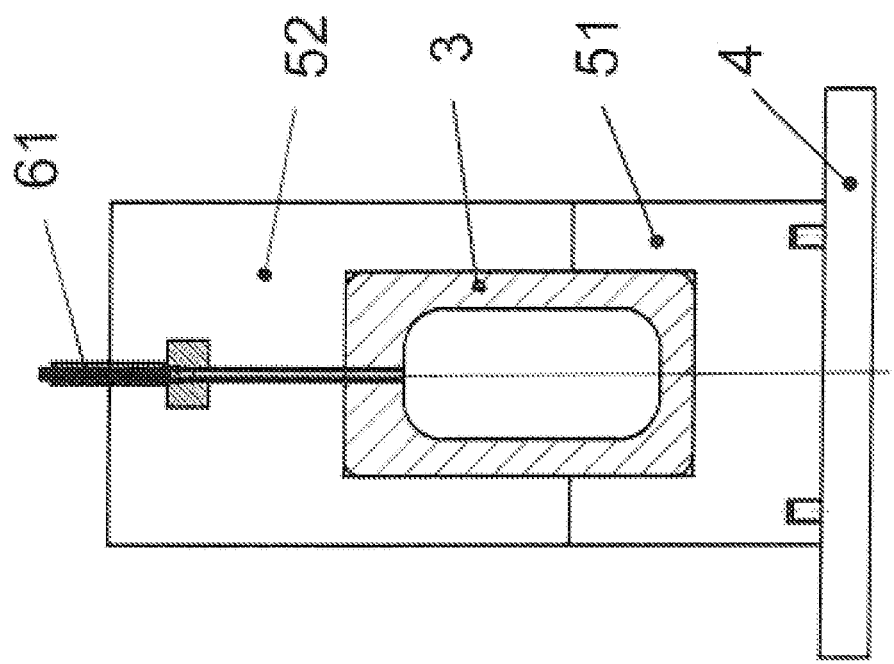
FIG. 5 shows the operative connection between the filling unit and the holding unit

The basic structure of the filling unit 6 is shown in FIG. 4. Accordingly, the filling unit 6 is designed as a filling sleeve 61 with an end seal to the filling port of the ultrasonic probe 3. The filling sleeve 61 is supported by a housing 62, a sealing piston 63, and a flange 64 in the housing of the vacuum chamber 1. The functional operative connection of the filling sleeve 61 and the ultrasonic probe 3 disposed in the holding unit 5 and to be filled is shown in FIG. 5.

Figure 6:
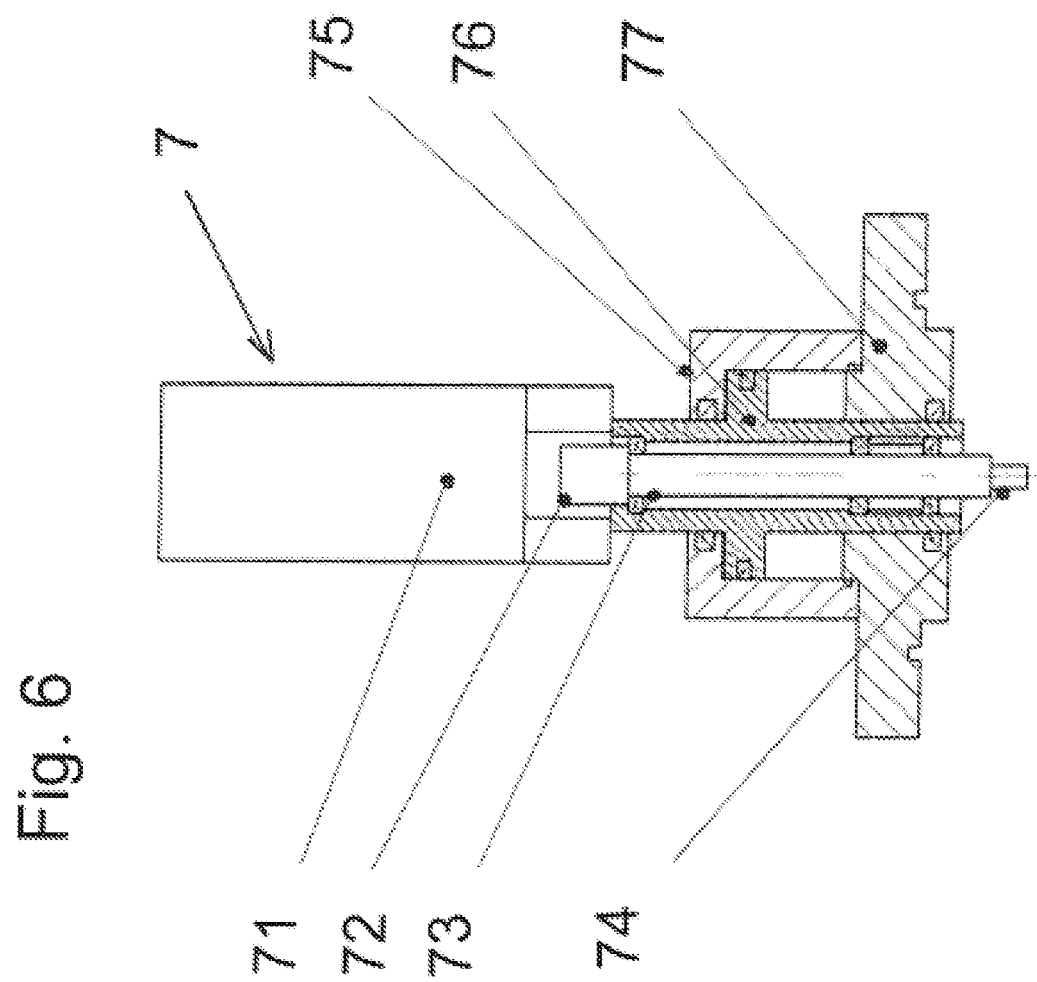
FIG. 6 shows a screwing tool as a separate assembly

The basic structure of the screwing tool 7 is shown in FIG. 6. Accordingly, the screwing tool 7 has a drive 71, a coupling 72, a shaft 73, and a screwing bit 74. The drive 71 for the screwing tool 7 is disposed outside the vacuum chamber 1. Starting from the drive 71, the screwing tool 7 is supported in the housing of the vacuum chamber 1 via a housing 75, a piston 76, and a flange 77 with a vacuum-resistant rotary feedthrough. The screwing tool 7 can also comprise a mechanical clamping element (not shown), which can be used to fix the position of a closure element 8 for the ultrasonic probe 3 to be filled.

Figure 8:
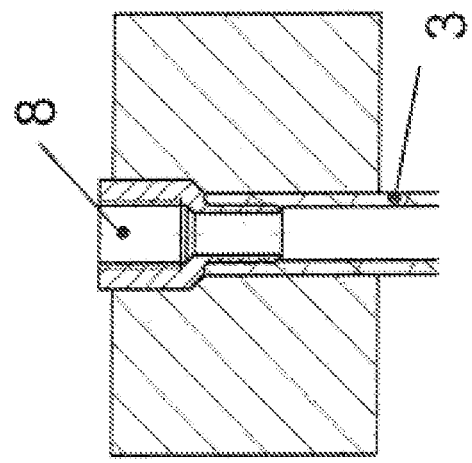
FIG. 8 shows a specific design of a closure element The device shown in the drawing is designed for filling an assembly of a non-vacuum-resistant system with a service fluid by means of vacuum-pressure filling and subsequent closing. An application for ultrasound probes for the medical sector is described as an exemplary embodiment in this regard.

The closure element 8 for the ultrasonic probe 3 to be filled is preferably designed with a screw contour. FIG. 8 shows a variant in which the closure element 8 is designed, for example, as a special screw with a guide pin and a seal on its end face.

If such a device is to be used to fill a non-vacuum-resistant ultrasonic probe 3 for the medical sector with a service fluid by means of vacuum-pressure filling, the following functional sequence results:

The ultrasonic probe 3 is inserted into a holding unit 5 outside the vacuum chamber 1 and fixed in position by joining the segments 51 and 52. A closure element 8 is then placed on the screwing tool 7 in the vacuum chamber 1. The holding unit 5 equipped with the ultrasonic probe 3 is then inserted into the vacuum chamber 1, positioned on the rotary device 4 and clamped via the shaft 41 with centering pin and tensioner. The vacuum chamber 1 is then closed by means of the closing device 2.

While the work steps described so far have been carried out manually by a worker, the following work steps are carried out automatically:

The holding unit 5 is pushed inside the vacuum chamber 1 to the filling position (left in FIG. 1). Then the filling tip of the filling sleeve 61 is provided. The entire system inside the vacuum chamber 1 is then evacuated. Then the filling process is carried out. Then the filling sleeve 61 is reset. Then the sniffing starts. The holding unit 5 is then pushed toward the screw position (right in FIG. 1). The screwing tool 7 is then provided. The closure element 8 is then screwed into the filling port of the ultrasonic probe 3. The screwing tool 7 is then reset. At the same time, the vacuum chamber 1 is ventilated. The holding unit 5 is then moved to the home position.

After these automatically performed work steps, the following work steps are performed again manually by a worker:

The closing device 2 of the vacuum chamber 1 is opened. The holding unit 5 is removed from the vacuum chamber 1. The ultrasonic probe 3, now filled, is removed from the holding unit 5.

Thus, an ultrasonic probe 3, which previously could not be filled air-free due to a lack of vacuum resistance, was advantageously filled and closed air-free using a vacuum-pressure method.

LIST OF REFERENCE NUMERALS 1 vacuum chamber
2 closing device
3 ultrasonic probe
4 rotary device
41 shaft with centering pin and tensioner
42 swivel drive
43 toothed belt pulley
44 flange with bearing and vacuum-resistant rotary feedthrough
45 sword bolts
5 holding unit
51 segment
52 segment
53 free available space
54 free available space
55 recess
6 filling unit
61 filling sleeve
62 housing
63 sealing piston 64 flange
7 screwing tool
71 drive
72 coupling
73 shaft
74 screwing bit
75 housing
76 piston
77 flange with vacuum-resistant rotary feedthrough
8 closure element

The invention claimed is:

1. A device for filling an assembly of a non-vacuum-resistant system with a service fluid by vacuum-pressure filling and subsequent closing thereof, the device comprising:
    a vacuum chamber for receiving at least one assembly to be filled, wherein a rotary device for supporting and moving at least one holding unit for an assembly to be filled is disposed in an interior of the vacuum chamber in a lower region, wherein the at least one holding unit is assembled from at least two separate segments which, in an assembled position, form a common free available space in an interior of the at least two separate segments, an inner contour of which is congruent with an outer contour of the assembly to be filled, and wherein an additional free available space is formed in a segment of the holding unit above the outer contour of the assembly to be filled, wherein a screwing tool for a closure element of the assembly to be filled and a filling unit are disposed in the interior of the vacuum chamber above the holding unit, and wherein sections of the filling unit and the closure element are to be brought into an operative connection with the assembly to be filled can each be moved into the additional free available space of the holding unit above the outer contour of the assembly to be filled.

2. The device according to claim 1, wherein the rotary device includes a shaft with centering pin and tensioner for the holding unit, wherein a drive for the rotary device is a swivel drive with toothed belt pulleys and is disposed outside the vacuum chamber, and wherein the rotary device is supported in a housing of the vacuum chamber starting from the drive via a flange with bearing and vacuum-resistant rotary feedthrough.

3. The device according to claim 1, wherein mutually congruent locking elements are formed on a top side of the rotary device and on a bottom side of a segment of the holding unit resting on the rotary device in the assembled position.

4. The device according to claim 3, wherein locking elements on the rotary device include two sword bolts and two cylindrical recesses on the segment of the holding unit.

5. The device according to claim 1, wherein the filling unit is designed with a filling sleeve, includes an end seal to a filling port of the assembly to be filled, and is supported in a housing of the vacuum chamber via a housing, a sealing piston, and a flange.

6. The device according to claim 1, wherein the screwing tool has a drive, a coupling, a shaft, and a screwing bit, wherein the drive for the screwing tool is disposed outside the vacuum chamber and the screwing tool is supported, starting from the drive, in a housing of the vacuum chamber via a housing, a piston, and a flange with a vacuum-resistant rotary feedthrough.

7. The device according to claim 1, wherein the screwing tool includes a mechanical clamping element for fixing a position of a closure element for the assembly to be filled.

8. The device according to claim 1, wherein the closure element of the assembly to be filled is a special screw with a guide pin and a seal on an end face of the special screw.

* * * * *